United States Patent
Mullett et al.

(10) Patent No.: US 6,330,169 B2
(45) Date of Patent: Dec. 11, 2001

(54) CONVERTER OUTPUT REGULATION VIA CHANNEL RESISTANCE MODULATION OF SYNCHRONOUS RECTIFIERS

(75) Inventors: Charles E. Mullett, Santa Paula; Thomas M. Ingman, Somis, both of CA (US)

(73) Assignee: Condor D.C. Power Supplies Inc., Oxnard, CA (US)

(*) Notice: Subject to any disclaimer, the term of this patent is extended or adjusted under 35 U.S.C. 154(b) by 0 days.

(21) Appl. No.: 09/792,689

(22) Filed: Feb. 23, 2001

Related U.S. Application Data
(60) Provisional application No. 60/184,954, filed on Feb. 25, 2000.

(51) Int. Cl.[7] .................................................. H02M 3/335
(52) U.S. Cl. .................. 363/16; 363/21.06; 363/21.1; 363/21.14; 363/21.18; 363/26
(58) Field of Search ............................ 363/16, 21.01, 363/21.06, 21.1, 21.14, 21.18, 25, 26, 89, 97, 127, 131, 133, 134

(56) References Cited

U.S. PATENT DOCUMENTS
| | | | |
|---|---|---|---|
| 5,336,985 | * | 8/1994 | McKenzie ..................... 323/267 X |
| 6,049,471 | * | 4/2000 | Korcharz ........................ 363/20 |
| 6,069,804 | * | 5/2000 | Ingman ........................ 363/21.14 |

* cited by examiner

*Primary Examiner*—Jessica Han
(74) *Attorney, Agent, or Firm*—James F. Kirk (57) ABSTRACT

An output voltage regulation system allows independent output regulation of multi-output dc-dc switched-mode power converters. The channel resistance of MOSFET synchronous output rectifiers are controlled to obtain the voltage drop required to keep the respective output between predetermined limits concurrent with wide excursions in output load. A typical circuit has a transformer with an input winding coupled to a dc source. A transformer has at least a first and second output winding. A switched-mode regulator means samples a portion of the first output voltage and provides at least a first pulse-width modulated drive voltage having a first state and a second state to a first input semiconductor switch control terminal. The drive voltage first state turns the input semiconductor switch on and the drive voltage second state turns the input semiconductor switch off. The switched-mode regulator means is further characterized to adjust the ratio of the switch's on time to the switch's off time to control the first output voltage to remain within a predetermined range that is proportional to a precision reference voltage. A gate drive means is responsive to at least the first pulse-width modulated drive voltage for providing a first gate drive signal having a peak voltage swing to the synchronous rectifier control terminal. A control means samples a portion of the second dc output voltage and controls the peak voltage swing of the first gate drive signal to control the second output voltage to remain within a predetermined range.

7 Claims, 6 Drawing Sheets

CONVERTER OUTPUT REGULATION VIA CHANNEL RESISTANCE MODULATION OF SYNCHRONOUS RECTIFIERS

This application claims priority from Provisional Application Ser. No. 60/184,954 filed Feb. 25, 2000 having the same inventors and assignee.

BACKGROUND

This invention relates to dc-to-dc power supplies for converting a single input voltage into two or more dc output voltages typically sense a single output voltage, usually the output voltage delivering the highest output power, and precisely regulate that output voltage while roughly regulating any additional output voltages. The precise regulation of a second or any number of additional output voltages is typically achieved by the use of dedicated individual series regulators, each output having its own series or pass regulator and a dedicated feedback amplifier. Post regulation using series or pass regulators is inefficient because of the energy lost in the series pass transistor and costly in terms of the additional parts required for each individual output voltage.

FIELD OF THE INVENTION

This invention relates to the field of power supplies and more particularly to the field of power converters designed for use in industrial, office or household appliances for the conversion of a single source of dc voltage to a plurality of output voltage sources.

SUMMARY OF THE INVENTION

In a switched-mode regulator, a first control system adjusts the ratio of an input switch's on time to off time to control a first output voltage to remain within a predetermined range that is proportional to a precision reference voltage. The first control system synchronizes a gate drive signal to a first synchronous rectifier. The first synchronous rectifier gate is driven to be fully on or off. Synchronous rectification is discussed in U.S. Pat. No. 6,069,804, BI-DIRECTIONAL DC-TO-DC CONVERTER, issued on May 30, 2000, to Thomas M. Ingman, John W. Beecroft, and Charles E. Mullett, the content of which is incorporated herein by reference in its entirety. A second control system samples a portion of a second output voltage and controls the synchronization and peak voltage swing of a gate drive signal to a second synchronous rectifier that controls a second output voltage. The peak swing of the gate drive to the second synchronous rectifier adjusts the channel resistance of the second synchronous rectifier to regulate the second output voltage to remain within a predetermined range.

PREFERRED EMBODIMENT

Figure 1:
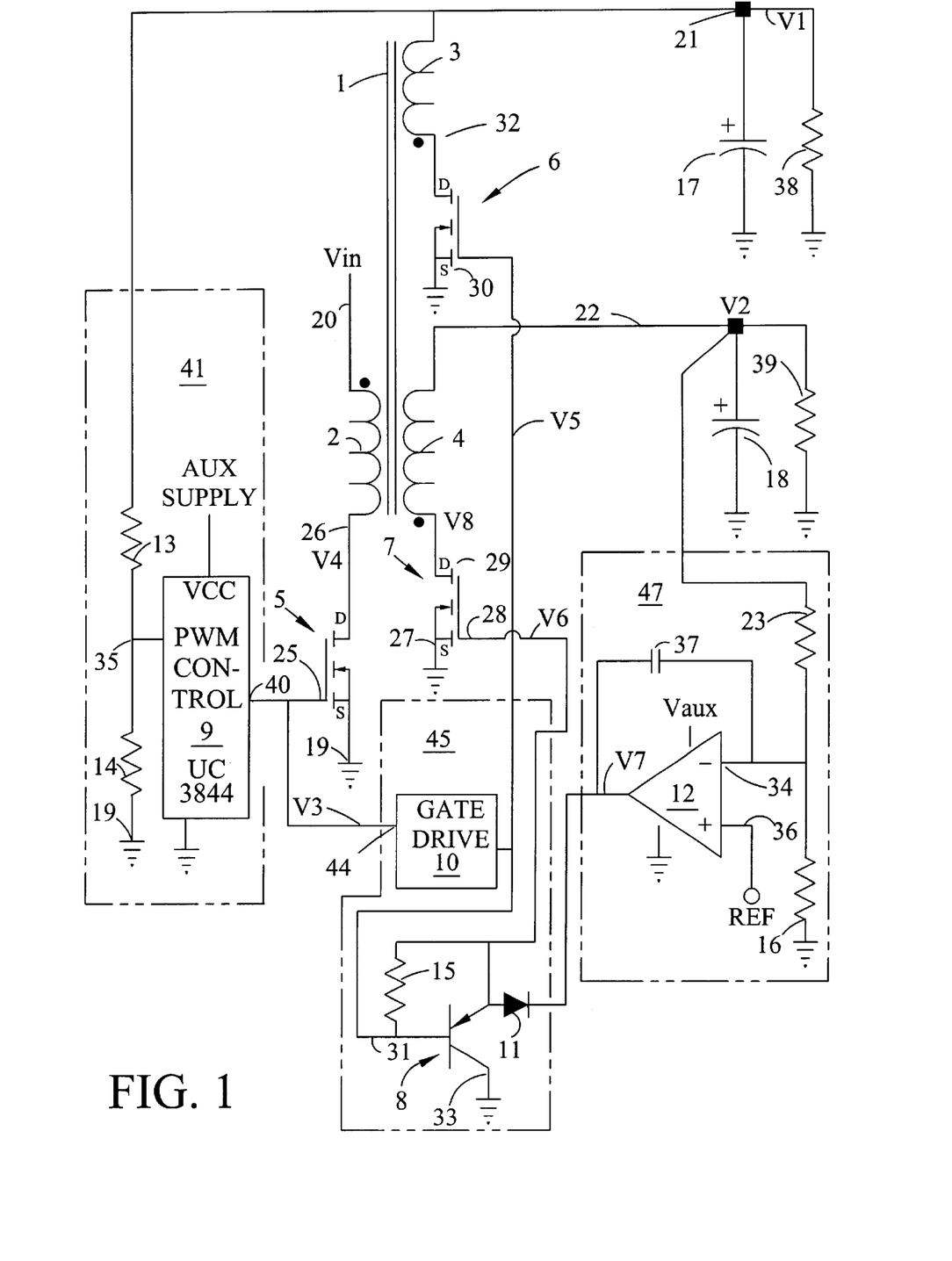
FIG. 1 is a schematic of a flyback converter topology showing a diode connected between the gate of a second synchronous rectifier and an error amplifier output.

FIG. 1 shows a two-output flyback dc-to-dc converter 42 having a dc voltage input Vin 20. The input 20 receives input current from a dc voltage source (not shown). The dc voltage input 20 is referenced to a reference potential, such as ground 19. The converter of FIG. 1 provides at least a first dc output voltage at a first dc output voltage node, such as the regulated dc output voltage V1 at first output node 21 applied to load 38. Output voltage V1 is filtered by first output capacitor 17.

A second dc output voltage V2 is provided at a second dc output voltage node 22. Output voltage V2 is coupled to drive second load resistor 39. Output voltage V2 is filtered by second output capacitor 18.

Transformer 1 has input or primary winding 2 with a first terminal coupled to the dc source Vin at node 20 and a second terminal connected to node 26. A first output transformer winding 3 and a second output transformer winding 4 are shown.

MOSFET (Metal Oxide Semiconductor Field Effect Transistor) switch 5 represents a first input semiconductor switch, has a conduction channel between its drain D and source S. The first switch 5 is driven into conduction or into a cutoff state by control terminal or gate 25. The conduction channel of switch 5 is shown coupled in series with the primary winding 2 and reference potential 19. The source of MOSFET switch 5 is connected to the reference potential or ground 19.

The gate 25 of the first input semiconductor switch 5 is driven by the output of a switched-mode regulator means such as the circuitry within phantom block 41 including a PWM Controller 9, typically an integrated circuit such as a UC3844 from the Unitrode Div. of Texas Instrument Inc. of Lexington, Mass. A control input 35 samples a portion of the first output voltage V1 via the resistor divider formed by first and second first output voltage sampling resistors 13, 14. The switched-mode regulator means 41 has an output terminal 40 that provides at least a first pulse-width modulated drive voltage, such gate drive signal V3 depicted by the top waveforms of FIGS. 2(a), 2(b), FIG. 4 and FIG. 6. Drive signal V3 has a first state or high level, and a second state, or low level that is applied to the first input semiconductor switch control terminal, gate 25.

The drive signal V3 first state drives the input semiconductor switch 5 into conduction or into an on state. The drive signal V3 second state turns the input semiconductor switch MOSFET 5 off. The PWM controller 9, the UC3844, within the switched-mode regulator means 41, is further characterized to adjust the ratio of the switch's on time between times $t_0$ and $t_1$ to the switch's off time between times $t_1$ and t3 to control the first output voltage V1 at output 21 to remain within a predetermined range. The predetermined range is typically within a few percent of a nominal voltage for all specified input voltage Vin to input 20 to the input or primary winding 2, load conditions at the first output 21 and temperature ranges specified for the design.

The switched-mode regulator means 41 automatically adjusts the duty ratio of the on time to the total cycle period of the on time plus the off time to control the first output voltage V1 at first output 21 to be proportional to a precision reference voltage within the PWM Controller 9. MOSFET 6 and first output capacitor 17, in combination, represent and are driven to function as a synchronous rectifier and capacitor filter means for coupling and filtering energy from the first transformer output winding 3 to the first output node 21. The gate of the first synchronous rectifier 6, MOSFET 6, is driven by a gate drive signal V5 shown in FIGS. 2(a) and 2(b).

The gate of the second synchronous rectifier, MOSFET 7 and second output capacitor 18, in combination, are driven to function as a second synchronous rectifier having a conduction channel from drain 29 to source 27 connected in series with the second transformer output winding 4, and a control terminal, such as the second synchronous rectifier's gate 28. The second synchronous rectifier's conduction channel, between its drain 29 and its source 27, is driven into a conductive state by a pulse width modulated rectifier drive voltage such as the second rectifier gate drive signal V6 assuming a high or positive state as shown between $t_1$ and $t_2$. During the $t_1$–$t_2$ interval, the synchronous rectifier couples energy from the second output winding 4 to the second dc output voltage V2 at second output voltage node 22.

Gate driver 10, PNP base to emitter resistor 15, and PNP transistor 8 within phantom block 45 represent a gate drive means. Voltage waveform V3, a gate drive signal from the output 40 of the PWM Controller 9, is applied to the gate driver input 44 of gate driver 10. Gate driver 10 inverts the signal out of PWM output terminal 40 and responds to the first pulse-width modulated drive voltage V3 second state by providing a first gate drive signal V5 to the first synchronous rectifier control terminal, gate 31.

The combination within phantom block 47 of error amplifier 12, the second resistor divider formed by the series combination of resistors 23 and 16, feedback capacitor 37 and clamp diode 11, form a control means for sampling a portion of the second dc output voltage V2 via the resistor divider at the junction of resistors 23 and 16. The control means operates to automatically control the amplitude of the peak voltage swing of the first gate drive signal V6 so as to adjust the resistance of the conduction channel of the second synchronous rectifier MOSFET 7 to control the second output voltage V2 at second output voltage node 22 to remain within a predetermined range.

Figure 2A:
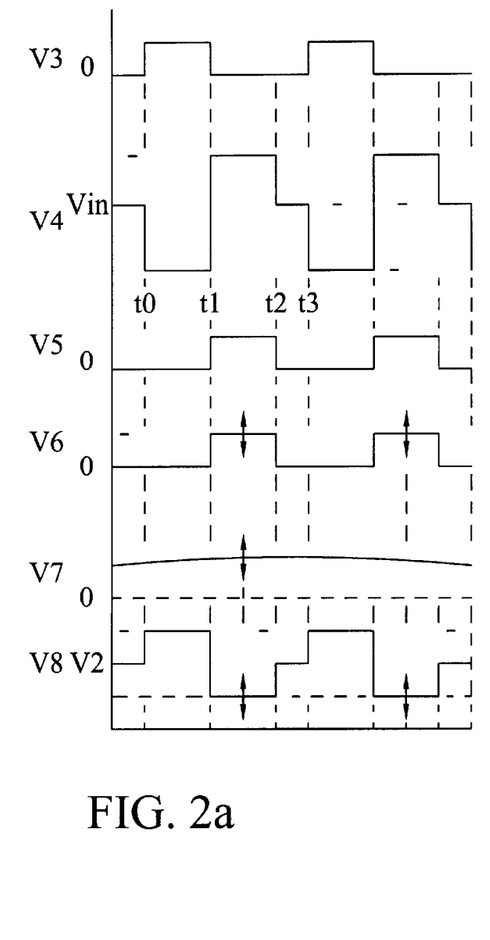
FIG. 2a is a timing chart for the circuit of FIG. 1 operating in the discontinuous mode.

As shown in FIG. 2(a), in the case of discontinuous conduction, first rectifier gate drive signal V5 terminates at $t_2$ thereby terminating the energy transfer from the first output winding to the V1 output at first output node 21 when the energy stored in the flux in the core of T1 is dissipated, the flux collapses and current ceases to flow in the second output winding 4 of transformer 1. The output of the gate driver 10 (V5) is applied directly to the first synchronous rectifier's gate 31 of MOSFET 6, the main output switch. The gate drive to gate 31 is always at full amplitude. Regulation of the output voltage V1 is accomplished by controlling the duty ration of on time to off time, the pulse width modulation of the first input semiconductor switch, MOSFET 5, as described earlier.

The invention applies to multi-output power supplies that use synchronous rectifiers, typically MOSFETs, in the subordinate outputs. The regulation of each of subordinate output is accomplished in like manner using a respective control means such as that shown in phantom block 47 for sampling a portion of the subordinate dc output voltage and by altering the conduction channel resistance ("on resistance") of the respective synchronous rectifier in response to changes in load current. In the embodiment of FIG. 1, phantom block 47 uses a conventional reference and an error amplifier to monitor the subordinate output voltage and develop an error signal out of amplifier 12. The error signal is used to clamp via diode 11, the peak amplitude of the gate drive signal to gate 28 of MOSFET 7, thus modifying its channel resistance.

As the second load resistor 39 at second output node 22 decreases and the output voltage V2 tends to rise, the error signal lowers the amplitude of the gate drive signal to gate 28, which increases the channel resistance and lowers the output voltage V2 to the required value. The range of control is limited by the internal "body" diode of the MOSFET 6, which determines the maximum voltage drop across the device in its conducting state. In its simplest form, as in FIG. 1, the invention is implemented in a multi-output flyback converter, but it can also be used in many other half-wave and full-wave topologies.

The gate drive signal V5 out of the GATE DRIVE 10 is applied to the base of PNP transistor 8. The collector of PNP transistor 8 is connected to ground. The emitter of PNP transistor 8 is connected to the gate 28 of the second synchronous rectifier MOSFET switch 7, but the peak voltage rise of the emitter driven by output 31 is clamped by the error signal at the output of error amplifier 12 via diode 11.

Error amplifier 12 is shown configured as an integrator, using capacitor 36 in a conventional connection between its output 49 and the inverting input at 34. As the load on output V2 changes, the output V7 of error amplifier 12 changes inversely and diode 11 clamps the rise of the amplitude of gate drive signal V6 driven through base to emitter resistor 15. PNP transistor 8 enables the output V5 of gate drive element or circuit 10 to pull the gate drive signal down quickly, and it also allows diode 11 to clamp the amplitude of V6 and control the conduction channel resistance of synchronous rectifier 6.

Figure 2B:
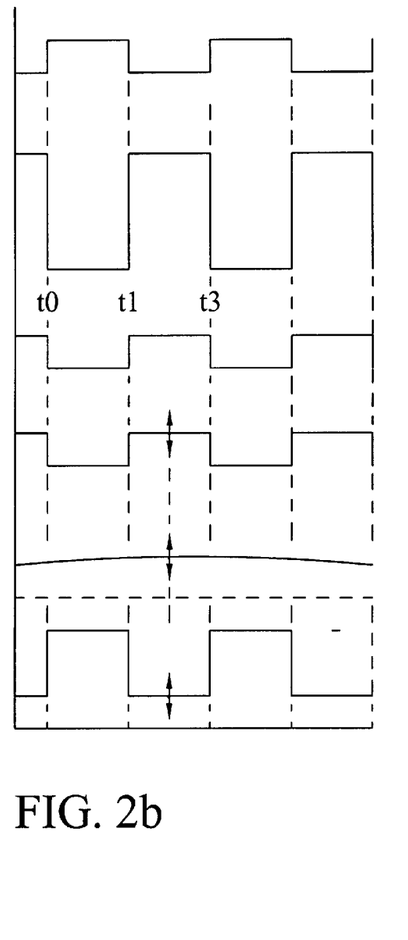
FIG. 2b is a timing chart for the circuit of FIG. 1 operating in the continuous mode.

FIGS. 2(a) and 2(b) illustrate the operation of the circuit at two different load conditions with the circuit operating in the discontinuous and continuous modes, respectively. In both cases, the gate drive signal to the gate of the first input semiconductor switch 5 originating at V3 begins at time to and ends at time $t_1$. In the discontinuous mode, shown in FIG. 2(a), the stored energy in transformer 1 is totally delivered to the load during each cycle during the interval $t_1$–$t_2$. At $t_2$ the current in the secondary windings ceases and the voltage across each transformer output winding collapses to zero. During the interval $t_1$–$t_2$, the second synchronous rectifier 7 conducts current to the output, and the output voltage is determined by the voltage across the secondary winding 4 in series with the conduction channel of the second synchronous rectifier 7, MOSFET switch 7. Varying the resistance of the conduction channel of the second synchronous rectifier 7 changes the voltage across the switch and thus regulates the output voltage V2.

FIG. 2(b) illustrates the continuous conduction case. The load current is high enough that the energy stored in transformer 1 is not fully delivered to the load during the second portion of the cycle, the interval $t_1$–$t_3$. In the continuous conduction case, the PWM control circuit 9 starts a new cycle by initiating a new pulse at time $t_3$. The gate drive circuitry 10 inverts this signal to turn off the first and second synchronous rectifiers 6 and 7.

Figure 3:
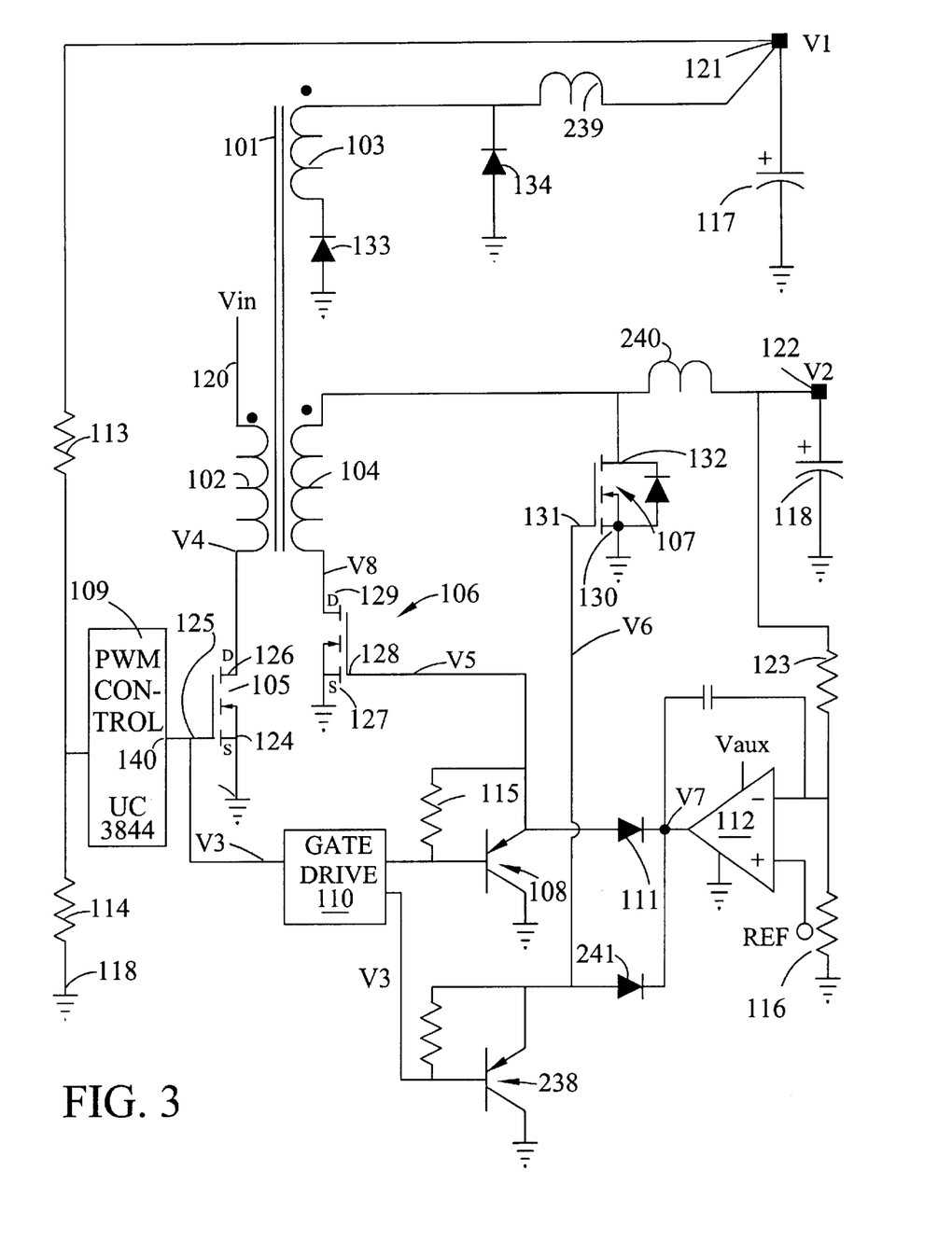
FIG. 3 is a schematic of a forward converter topology showing a diode connected between the synchronous rectifier control terminals and an error amplifier output.

FIG. 3 illustrates the invention applied to a forward converter topology using transformer 101. Primary 102 is connected to Vin. Input power switch 105 has drain 126 connected to the second terminal of primary 102. The drain voltage is V4. The source 124 is connected to ground and the gate 125 is driven by PWM (pulse width modulated) voltage V3 from the output 140 of a controller such as the UC3844 controller 109. V3 also drives gate drive circuit 110, which provides complementary drive signals to PNP transistors 108 and 238. Transformer 101 has a first and second secondary 103, 104. The first and main secondary 103 has a first terminal coupled to the cathode of clamp diode 134 and a first terminal of inductor 239. The second terminal of inductor 239 is coupled to first output capacitor 117 and to output voltage node 121 and to a resistor divider formed by resistors 113 and 114 which provide a sample of the output voltage to the input of the PWM controller 109. The anode of rectifier 133 is connected to ground.

The second secondary has a first terminal connected to the drain 132 of synchronous rectifier 107 and to a first terminal of inductor 240. Synchronous rectifier 107 has a source terminal 130 connected to ground and a gate terminal 131 that is connected to the emitter of PNP transistor 238. The PNP transistor 238 is connected via clamp diode 241 to the output of error amplifier 112. The second terminal of the second secondary is connected to drain 129 of synchronous rectifier 106. The drain voltage is identified as V8. The gate 128 of rectifier 106 is connected via clamp diode 111 to the output of error amplifier 112.

A subordinate output V2 uses synchronous switches as synchronous rectifiers (MOSFETs) 106 and 107, just as rectifier diode 133 and clamp diode 134 are used on the main output V1. The gate drive circuit produces drive signals to gates 128 and 131 turn the switches on and off, causing them to conduct in the circuit of V2 just as the diodes conduct on the main output V1. Resistor divider 123, 116 provides a scaled sample of the output voltage V2 to the inverting input of error amplifier 112. As the output is unloaded and the voltage V2 begins to rise out of tolerance, the error amplifier causes voltage V7 to begin to decrease. As V7 drops, diodes 111 and 241 clamp the gate voltages to MOSFETs 106 and 107 to lower and lower levels thereby increasing the channel resistance of the MOSFTS as they operate as synchronous rectifiers. The result is that the subordinate output V2 filtered by capacitor 118 drops into the proper range for V2.

Figure 4:
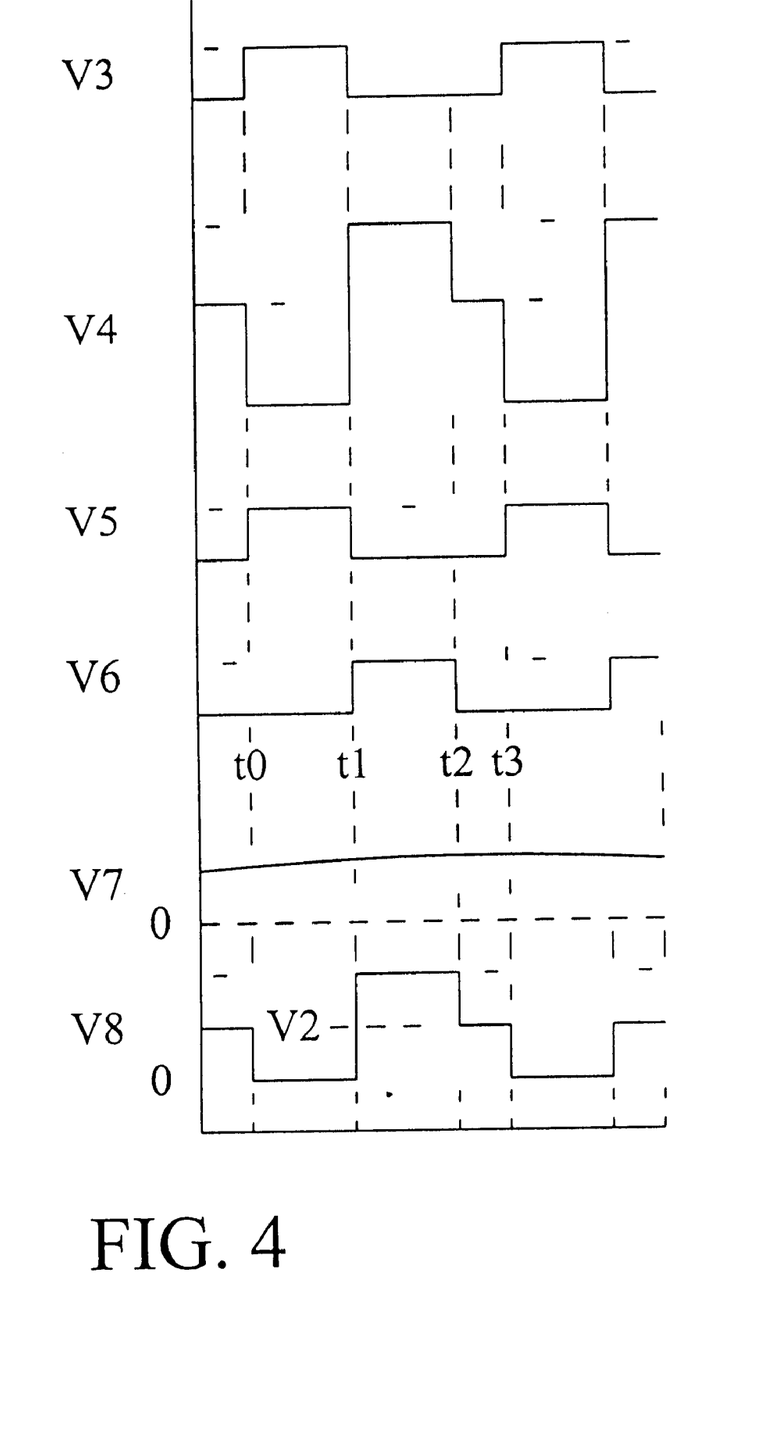
FIG. 4 is a timing chart for the circuit of FIG. 3 operating in the discontinuous mode.

FIG. 4 shows the key waveforms of the circuit of FIG. 3 operating in the discontinuous mode. The continuous mode waveforms are different in the same manner as in FIG. 2.

Figure 5:
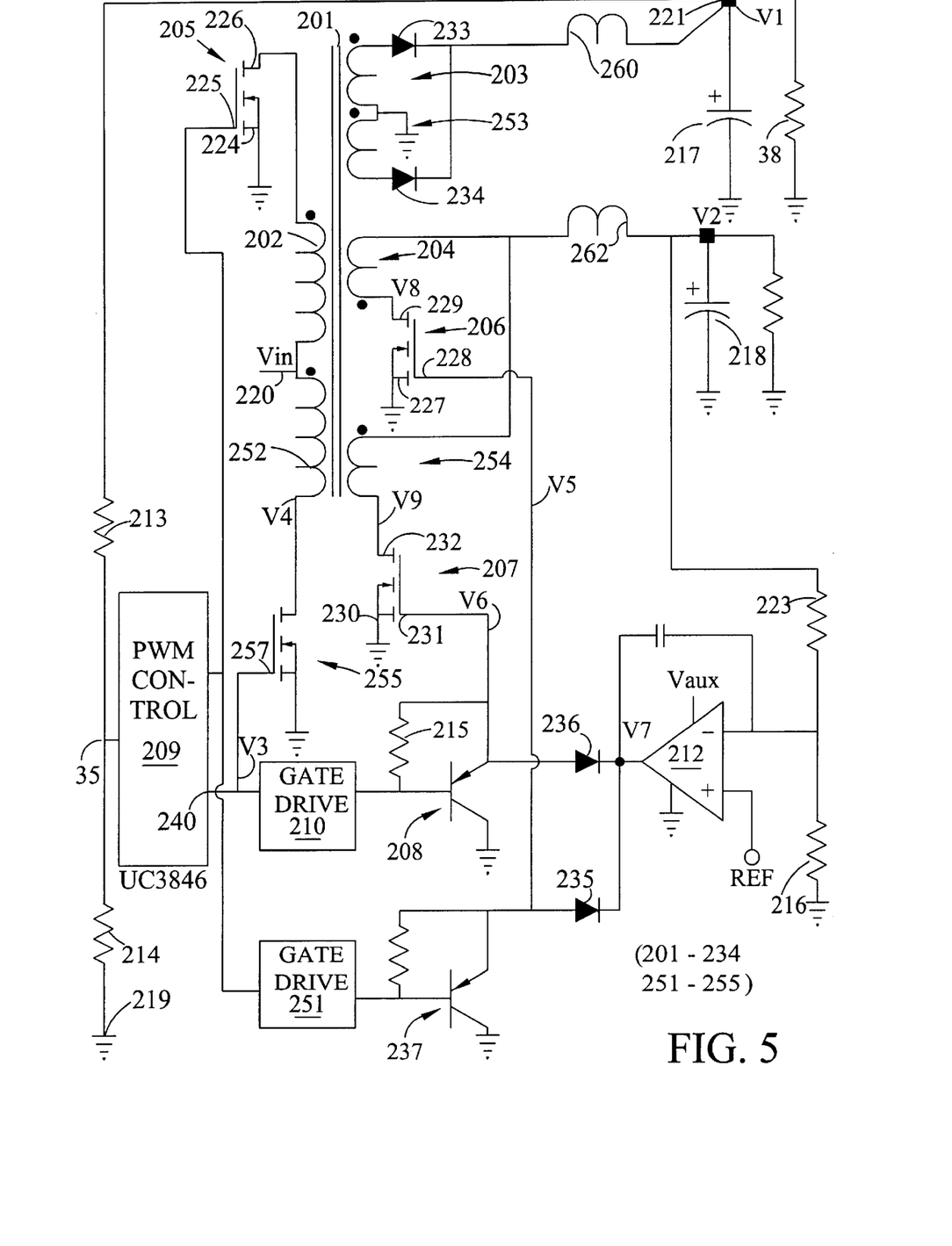
FIG. 5 is a schematic of a push-pull converter topology showing a diode connected between a second synchronous rectifier control terminals and a second error amplifier output.

FIG. 5 illustrates a third alternative embodiment showing the invention used with a push-pull converter topology. A UC3846 PWM controller 209 drives gates 225, of first and second input MOSFET switches 205, 255 which alternately switch transformer 201 primary windings 202, 252 to ground in response to PWM drive signals from outputs 240 241 from controller 209. The PWM signals also drive the inputs to gate drive circuits 210, 251 which provide output drive voltages to a first PNP 208 and a second PNP 237. The primary is center taped at terminal 220. Input voltage Vin is applied to terminal 220. Resistors 213, 214 form a divider that senses the output voltage V1 and provides a scaled sample to an input to the controller 209.

A subordinate output V2 uses synchronous switches (MOSFETS) 206 and 207 as rectifiers, just as diodes 233 and 234 are used on the main output V1. MOSFETs 206 and 207 have respective drains 229 and 232 that connect to windings 204 and 254, respectively. The respective sources 227 and 230 are connected to ground. The gate drive circuits produce drive signals to turn the switches on and off, causing them to conduct in the circuit of V2 just as the diodes conduct on the main output V1.

Primary windings 202 and 252 are matched in turns count and joined at center tap 220. Secondary and subordinate windings 204 and 254 are matched in turns count and joined at center tap 255. Inductors 260, and 262 perform volt second averaging for outputs VI and V2 respectively. A the output load at the V2 output decreases and the voltage rises, resistor divider 223 and 216 provides an error signal to the inverting input to amplifier 212 causing its output voltage at V7 to begin to drop. The drive signals V5 and V6 are clamped via clamp diodes 235 and 236 by V7 as it moves to a lower value thereby reducing the drive voltage to gates 231 and 228, and thereby increasing their respective channel resistances and reducing the V2 output voltage. Control of the channel resistance of the MOSFETs 206 and 207 is achieved in operation analogous to the control means of phantom block 47, diode 11 and PNP 8 with resistor 15 as shown and described above in connection with FIG. 1.

Figure 6:
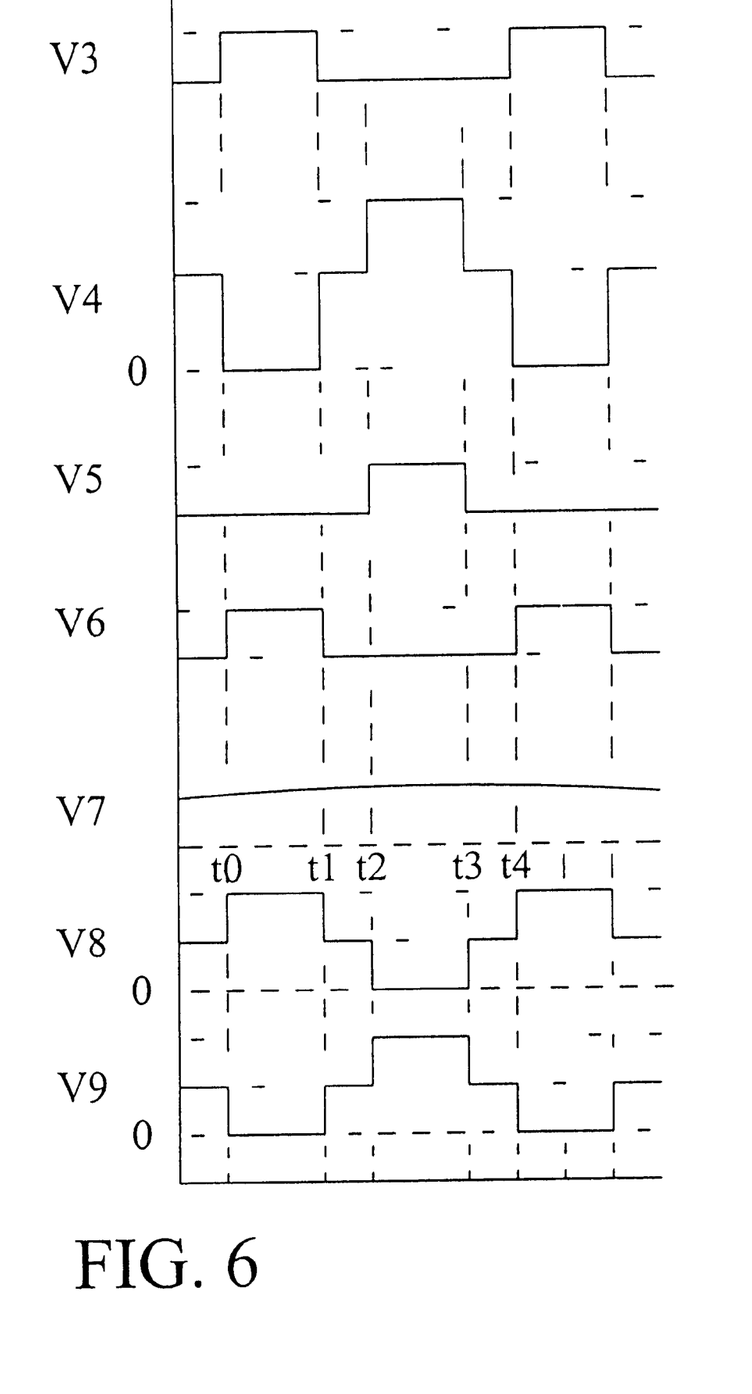
FIG. 6 is a timing chart for the circuit of FIG. 5.

FIG. 6 shows the key waveforms of the circuit. Since this is a full-wave topology, there are two conduction times, $t_0$–$t_1$ and $t_2$–$t_3$, and both of them shrink to zero as the load on output V1 decreases to zero.

In the design of multi-output converters, it is possible to derive the main converter's feedback from more than one output. For example, in FIG. 1 a resistor could be added from node 35 to output V2, with its value and that of resistor 13 chosen to provide the desired weighting between V1 and V2. With the feedback circuit of error amplifier 12, output V2 will be precisely regulated and its load changes will not affect V1 as long as V2 is within its range of control. At light loads, however, it hay not be possible to achieve enough voltage drop in MOSFET 7, due to the forward voltage of its body diode, to maintain regulation. In this case, the output voltage, V2, would rise. With the multiple feedback paths, the converter's pulse width will be decreased, lowering both output voltages. Although this compromises the output regulation of the main output, the overall performance may make it worthwhile.

While the invention has been explained in connection with several embodiments, it is intended that the appended claims be used to limit the scope of this patent.

We claim:

1. A flyback dc-to-dc converter having an input coupled to receive input current from a dc voltage source referenced to a reference potential, and provide at least a first dc output voltage at a first dc output voltage node and a second dc output voltage at a second dc output voltage node comprising:

a transformer having an input winding coupled to the dc source and a second terminal, and at least a first and second output winding, at least a first input semiconductor switch, having a conduction channel and a control terminal, the conduction channel being coupled in series with the primary winding and the reference potential, a rectifier filter means for coupling and filtering energy from the first transformer output winding to the first dc output voltage node, a synchronous rectifier having a conduction channel in series with the second transformer output winding and a control terminal, the synchronous rectifier conduction channel being driven into a conductive state by a pulse-width modulated rectifier drive voltage applied to its control terminal and synchronized to couple energy from the second output winding to the second dc output voltage node, a switched-mode regulator means for sampling a portion of the first output voltage and for providing at least a first pulse-width modulated drive voltage having a first state and a second state to the first input semiconductor switch control terminal, the drive voltage first state turning the input semiconductor switch on and the drive voltage second state turning the input semiconductor switch off, the switched-mode regulator means being further characterized to adjust the ratio of the switch's on time to the switch's off time to control the first output voltage to remain within a predetermined range that is proportional to the precision reference voltage, gate drive means responsive to at least the first pulse-width modulated drive voltage second state for providing a first gate drive signal having a peak voltage swing to the synchronous rectifier control terminal, a control means for sampling a portion of the second dc output voltage and for controlling the peak voltage swing of the first gate drive signal to control the second output voltage to remain within a predetermined range.

2. The dc-to-dc converter of claim 1 wherein the rectifier filter means for coupling and filtering energy from the first transformer is a synchronous rectifier having a conduction channel in series with the first transformer output winding and a control terminal, the synchronous rectifier conduction channel being driven into a conductive state by a pulse-width modulated rectifier drive voltage applied to its control terminal to couple energy from the first output winding to the first dc output voltage node.

3. The dc-to-dc converter of claim 1 wherein the control means for sampling a portion of the second dc output voltage and for controlling the peak voltage swing of the first gate drive signal further comprises:

an error amplifier having a first input connected to a precision reference level, a second input coupled to sample a portion of the second output voltage, and an output, a diode connected between the synchronous rectifier control terminal and the error amplifier output, the first gate drive signal to the synchronous rectifier control terminal being buffered to permit the error amplifier output operating through the diode to clamp the swing of the first gate drive signal applied to the synchronous rectifier control terminal, thereby controlling the resistance of the conduction channel to control the second output voltage to remain within a predetermined range.

4. A dc-to-dc converter having an input coupled to receive input current from a dc voltage source referenced to a reference potential, and to provide at least a first dc output voltage at a first dc output voltage node and a second dc output voltage at a second dc output voltage node comprising:

a transformer having an input winding coupled to the dc source and a second terminal, and at least a first and second output winding, at least a first input semiconductor switch, having a conduction channel and a control terminal, the conduction channel being coupled in series with the primary winding and the reference potential, a rectifier filter means for coupling and filtering energy from the first transformer output winding to the first dc output voltage node, a synchronous rectifier having a conduction channel in series with the second transformer output winding and a control terminal, the synchronous rectifier conduction channel being driven into a conductive state by a pulse-width modulated rectifier drive voltage applied to its control terminal to couple energy from the second output winding to the second dc output voltage node, a switched-mode regulator means for sampling a portion of the first output voltage and for providing at least a first pulse-width modulated drive voltage having a first state and a second state to the first input semiconductor switch control terminal, the drive voltage first state turning the input semiconductor switch on and the drive voltage second state turning the input semiconductor switch off, the switched-mode regulator means being further characterized to adjust the ratio of the switch's on time to the switch's off time to control the first output voltage to remain within a predetermined range that is proportional to the precision reference voltage, gate drive means responsive to at least the first pulse-width modulated drive voltage for providing a first gate drive signal having a peak voltage swing to the synchronous rectifier control terminal, a control means for sampling a portion of the second dc output voltage and for controlling the peak voltage swing of the first gate drive signal to control the second output voltage to remain within a predetermined range.

5. The dc-to-dc converter of claim 4 wherein the rectifier filter means for coupling and filtering energy from the first transformer is a synchronous rectifier having a conduction channel in series with the first transformer output winding and a control terminal, the synchronous rectifier conduction channel being driven into a conductive state by a pulse-width modulated rectifier drive voltage applied to its control terminal to couple energy from the first output winding to the first dc output voltage node.

6. The dc-to-dc converter of claim 4 wherein the control means for sampling a portion of the second dc output voltage and for controlling the peak voltage swing of the first gate drive signal further comprises:

an error amplifier having a first input connected to a precision reference level, a second input coupled to sample a portion of the second output voltage, and an output, a diode connected between the synchronous rectifier control terminal and the error amplifier output, the first gate drive signal to the synchronous rectifier control terminal, being buffered to permit the error amplifier output operating through the diode to clamp the swing of the first gate drive signal applied to the synchronous rectifier control terminal, thereby controlling the resistance of the conduction channel to control the second output voltage to remain within a predetermined range.

7. A dc-to-dc converter having an input coupled to receive input current from a dc voltage source referenced to a reference potential, and to provide at least a first dc output voltage at a first dc output voltage node and a second dc output voltage at a second dc output voltage node comprising:

a synchronous rectifier having a conduction channel in series with a transformer output winding for a second output and a control terminal, the synchronous rectifier conduction channel being driven into a conductive state by a pulse-width modulated rectifier drive voltage applied to its control terminal, gate drive means responsive to at least a first pulse-width modulated drive voltage for providing a first gate drive signal having a peak voltage swing to the synchronous rectifier control terminal, an error amplifier having a first input connected to a precision reference level, a second input coupled to sample a portion of the second output voltage, and an output, a clamp diode connected between the synchronous rectifier control terminal and the error amplifier output, the first gate drive signal to the synchronous rectifier control terminal, being buffered to permit the error amplifier output operating through the diode to clamp the swing of the first gate drive signal applied to the synchronous rectifier control terminal, thereby modulating the resistance of the synchronous rectifier conduction channel to control the second output voltage to remain within a predetermined range.

* * * * *